US007004454B2

(12) United States Patent
Petrone et al.

(10) Patent No.: US 7,004,454 B2
(45) Date of Patent: Feb. 28, 2006

(54) MOTORCYCLE AND SMALL VEHICLE LIFT

(75) Inventors: Peter A Petrone, Wellington, FL (US); Lawrence E. Meyer, Wellington, FL (US)

(73) Assignee: Ultimate Lift, INC, Wellington, FL (US)

( * ) Notice: Subject to any disclaimer, the term of this patent is extended or adjusted under 35 U.S.C. 154(b) by 0 days.

(21) Appl. No.: 10/601,725

(22) Filed: Jun. 23, 2003

(65) Prior Publication Data

US 2004/0007697 A1 Jan. 15, 2004

Related U.S. Application Data

(63) Continuation-in-part of application No. 10/187,376, filed on Jul. 1, 2002, now Pat. No. 6,598,855.

(51) Int. Cl.
*B60P 1/48* (2006.01)

(52) U.S. Cl. .................. 254/10 R; 254/8 R; 254/93 H; 254/10 B; 254/8 B

(58) Field of Classification Search ................ 254/8 R, 254/9 R, 10 R, 8 B, 9 B, 10 B, 8 C, 9 C, 254/10 C, 93 H, 131, 133 R, 124; 414/743, 414/11, 917; 269/904, 58–59
See application file for complete search history.

(56) References Cited

U.S. PATENT DOCUMENTS

| | | | | | |
|---|---|---|---|---|---|
| 1,080,581 | A | * | 12/1913 | Preece | 254/10 R |
| 2,603,454 | A | | 7/1952 | Newton et al. | |
| 2,643,779 | A | * | 6/1953 | Hamlin | 254/242 |
| 2,785,807 | A | | 3/1957 | Prowinsky | |
| 2,814,394 | A | * | 11/1957 | Witcher | 414/743 |
| 2,925,999 | A | * | 2/1960 | Hopkins, Jr. | 254/10 C |
| 2,929,519 | A | | 3/1960 | Taylor | |
| 3,275,296 | A | * | 9/1966 | Meyer | 254/8 R |
| 3,647,183 | A | * | 3/1972 | Rishovd | 254/2 B |
| 3,848,749 | A | * | 11/1974 | Anderson et al. | 212/284 |
| 3,863,890 | A | | 2/1975 | Ruffing | |
| 4,088,303 | A | | 5/1978 | Aquila | |
| 4,190,233 | A | * | 2/1980 | Godfrey | 254/4 B |
| 4,324,384 | A | | 4/1982 | Elser | |
| 4,348,010 | A | | 9/1982 | Baxter | |
| 4,460,158 | A | | 7/1984 | Chiesa et al. | |
| 4,479,632 | A | * | 10/1984 | McIntire et al. | 254/3 B |
| 4,681,299 | A | | 7/1987 | Siebert | |
| 4,723,756 | A | | 2/1988 | Stumpf, Jr. | |
| 4,796,861 | A | * | 1/1989 | Petty | 254/8 B |

(Continued)

FOREIGN PATENT DOCUMENTS

DE 003723455 A1 * 1/1989

*Primary Examiner*—Joseph J. Hail, III
*Assistant Examiner*—Bryan Muller
(74) *Attorney, Agent, or Firm*—Butzel Long

(57) ABSTRACT

A lift apparatus includes a base frame having a pair of ground engaging caster assemblies and a pair of horizontally extending divergent legs each having an inner end attached to the base frame and an outer end with a roller attached thereto, the casters and the rollers permitting the lift apparatus to roll across the ground surface. A dual parallelogram linkage includes a pair of the posts attached to the base frame and is attached to vehicle support arms. An actuator is connected between the linkage and the base frame and is manually actuated to selectively raise and lower the vehicle support arms between a lowered position for engaging and disengaging from a vehicle and a fully raised position.

1 Claim, 9 Drawing Sheets

U.S. PATENT DOCUMENTS 4,899,985 A 2/1990 Good
5,114,118 A * 5/1992 Schrader ..................... 254/8 R
5,150,999 A * 9/1992 Dugan ....................... 414/24.5
5,193,784 A 3/1993 Obernberger
5,211,265 A 5/1993 Gregg
5,211,376 A 5/1993 Anderson
5,232,203 A * 8/1993 Butts .......................... 254/8 R
5,271,603 A 12/1993 White
5,356,214 A * 10/1994 Styles ........................ 366/285
5,358,265 A 10/1994 Yaple
5,372,353 A * 12/1994 West ........................ 254/10 B
5,518,224 A 5/1996 Anderson
5,536,135 A * 7/1996 Robertson ................... 414/728
5,660,518 A * 8/1997 Meier ......................... 414/458
5,690,314 A 11/1997 Williams
5,732,931 A * 3/1998 Massel ....................... 254/8 B
5,944,473 A * 8/1999 Saucier et al. .............. 414/546
6,010,299 A * 1/2000 Jesswein ..................... 414/743
6,092,787 A 7/2000 Nayman
6,189,864 B1 * 2/2001 Crow et al. ................. 254/8 B
6,241,227 B1 * 6/2001 Berdan et al. ................ 269/17
6,276,665 B1 * 8/2001 Hawkins et al. ............ 254/8 B
6,457,700 B1 * 10/2002 Hong ......................... 254/8 B
6,585,231 B1 * 7/2003 Fratoni, Jr. ............... 254/93 H
2001/0026756 A1 * 10/2001 Mortimore .................. 414/556

* cited by examiner

MOTORCYCLE AND SMALL VEHICLE LIFT

CROSS-REFERENCE TO RELATED APPLICATION

This application is a continuation-in-part of U.S. patent application Ser. No. 10/187,376 filed Jul. 1, 2002, now U.S. Pat. No. 6,598,855.

BACKGROUND OF THE INVENTION

The present invention relates generally to an apparatus for lifting small vehicles such as motorcycles for maintenance and storage purposes.

There are many different prior art lifts designed for use with small vehicles such as motorcycles, motorbikes, snowmobiles, garden tractors, and the like. Typically, these lifts use a jack to raise a platform or arms supporting either the vehicle ground engaging portion (tires, treads, etc.) or the vehicle frame.

The U.S. Pat. No. 4,088,303 shows a boom pivoted at one end on the upper end of a post and a hydraulic cylinder for raising and lowering the boom. A platform is attached to an opposite end of the boom for supporting a vehicle.

The U.S. Pat. No. 4,460,158 shows a lift for mopeds and motorcycles having a base, a jack for raising and lowering a frame hinged to the base and a support attached to the frame for clamping the footboard of a Vespa brand moped.

The U.S. Pat. No. 4,723,756 shows a lift with four vertically telescoping legs that can be pinned in place when a jack has raised the lift to the desired height.

The U.S. Pat. No. 4,899,985 shows a low-profile hydraulic lift with a pivoted lift arm having detachable lift heads which include hooks, support yokes, chains and support harnesses.

The U.S. Pat. No. 5,211,265 shows a scissors-type snowmobile lift with rails to contact the snowmobile bellypan.

The U.S. Pat. No. 5,271,603 shows a lifting platform connected to a base by four parallel links actuated by a hydraulic jack.

U.S. Pat. No. 6,092,787 shows a manually operated motorcycle lift with a front wheel clamp and a removable extension under the unsupported rear wheel.

SUMMARY OF THE INVENTION

The present invention concerns an apparatus for lifting a small vehicle, such as a motorcycle, for various purposes such as cleaning, maintenance, repositioning from one location to another and storage. The lift apparatus includes: a ground engaging base frame having a generally horizontally extending central beam with a generally vertically extending intermediate beam attached at each end thereof, each said intermediate beam having an upper end with a generally horizontally extending end beam attached thereto, a pair of spaced apart upwardly extending posts and a pair of generally horizontally extending legs, said legs each having an inner end adjacent one of said posts and an outer end, said leg inner, ends being spaced a first predetermined distance apart and said leg outer ends being spaced a second predetermined distance apart greater than said first predetermined distance; a pair of parallelogram linkages, each said linkage having an upper link, a lower link extending generally parallel to said upper link, an outer link, and an inner link formed by a portion of an associated one of said posts, said upper link being connected by first and second pivot means to said inner and outer links respectively, said lower link being connected by third and fourth pivot means to said inner and outer links respectively; a vehicle support means attached to said outer links; and an actuator means having a lower end pivotally connected to said base frame and an upper end pivotally connected to said lower links whereby extension of said actuator means raises said vehicle support means between a lowered position for engaging and disengaging from a vehicle and a fully raised position.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
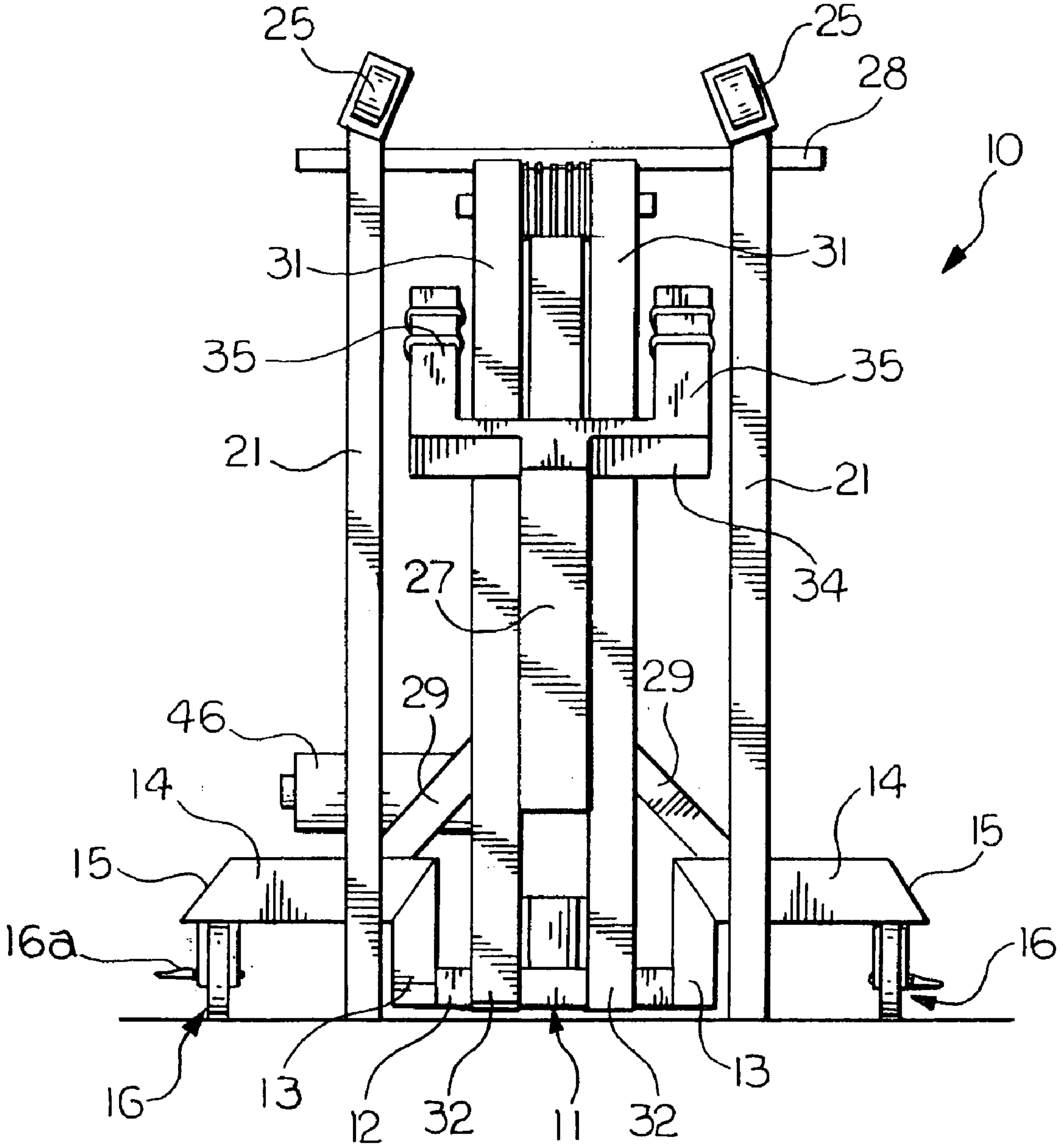
FIG. 1 is a front elevation view of a lift apparatus in accordance with the present invention in a storage position.
Figure 2:
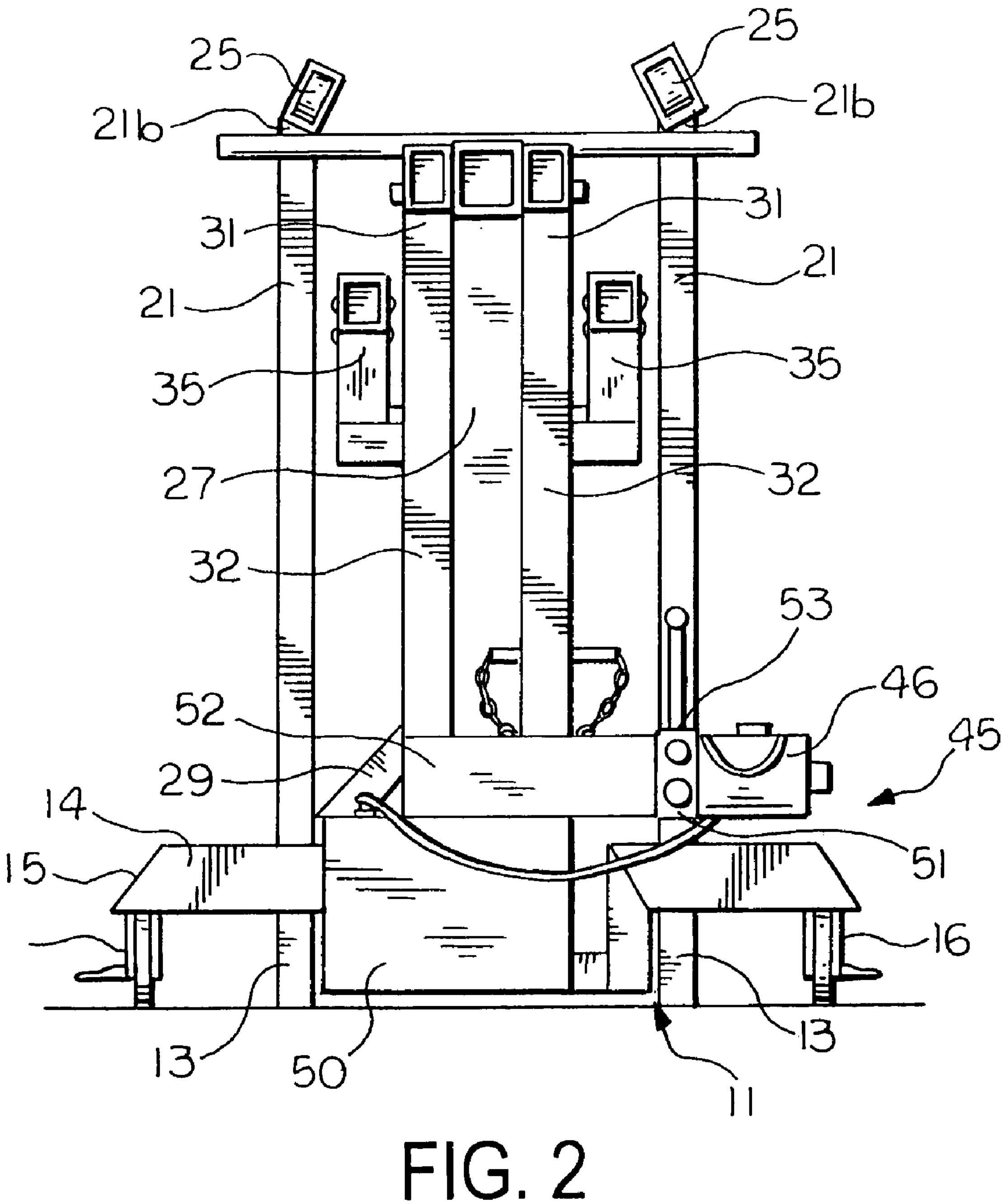
FIG. 2 is rear elevation view of the lift apparatus shown in FIG. 1.
Figure 3:
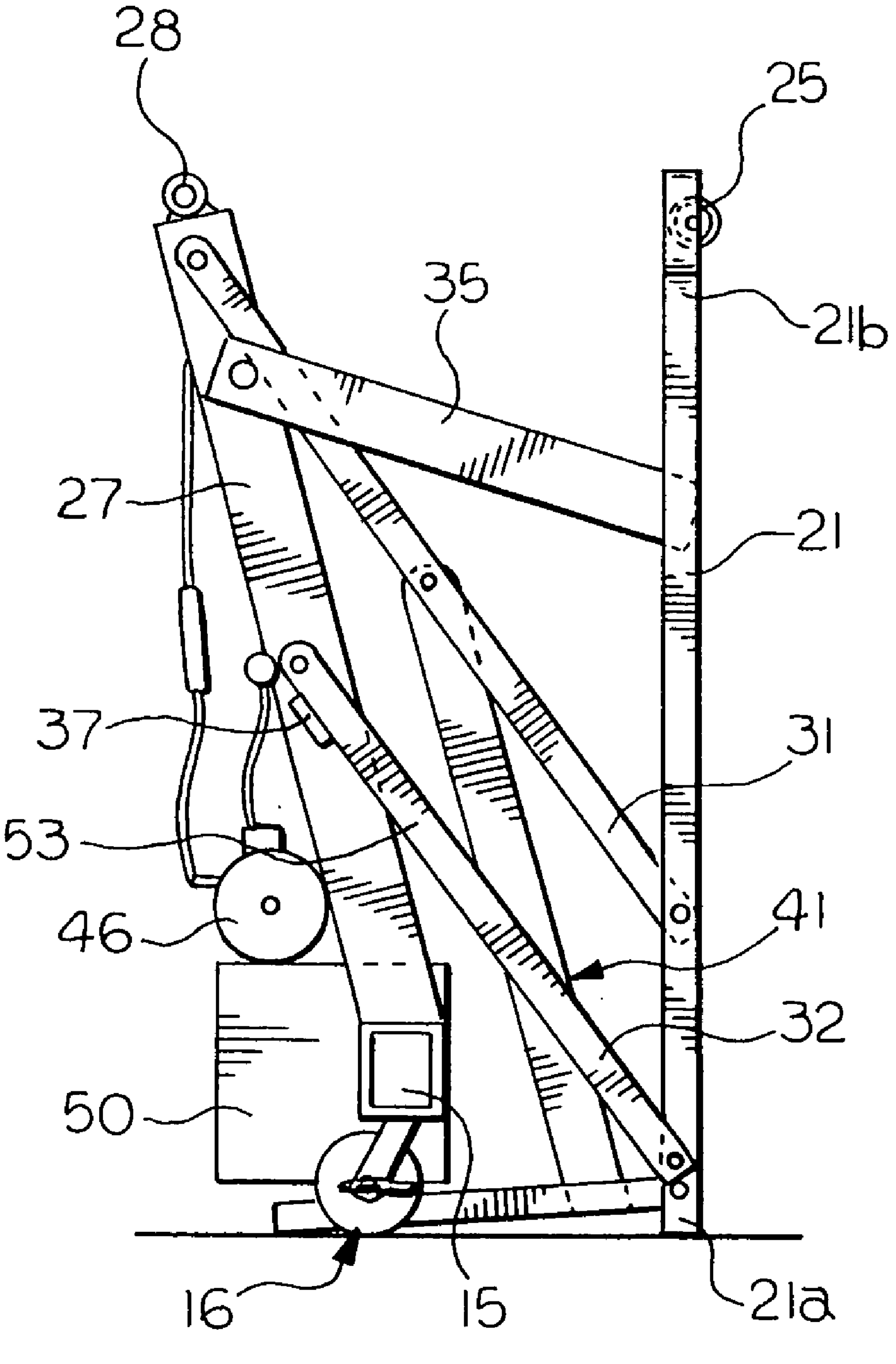
FIG. 3 is a left side elevation view of the lift apparatus shown in FIG. 1.
Figure 4:
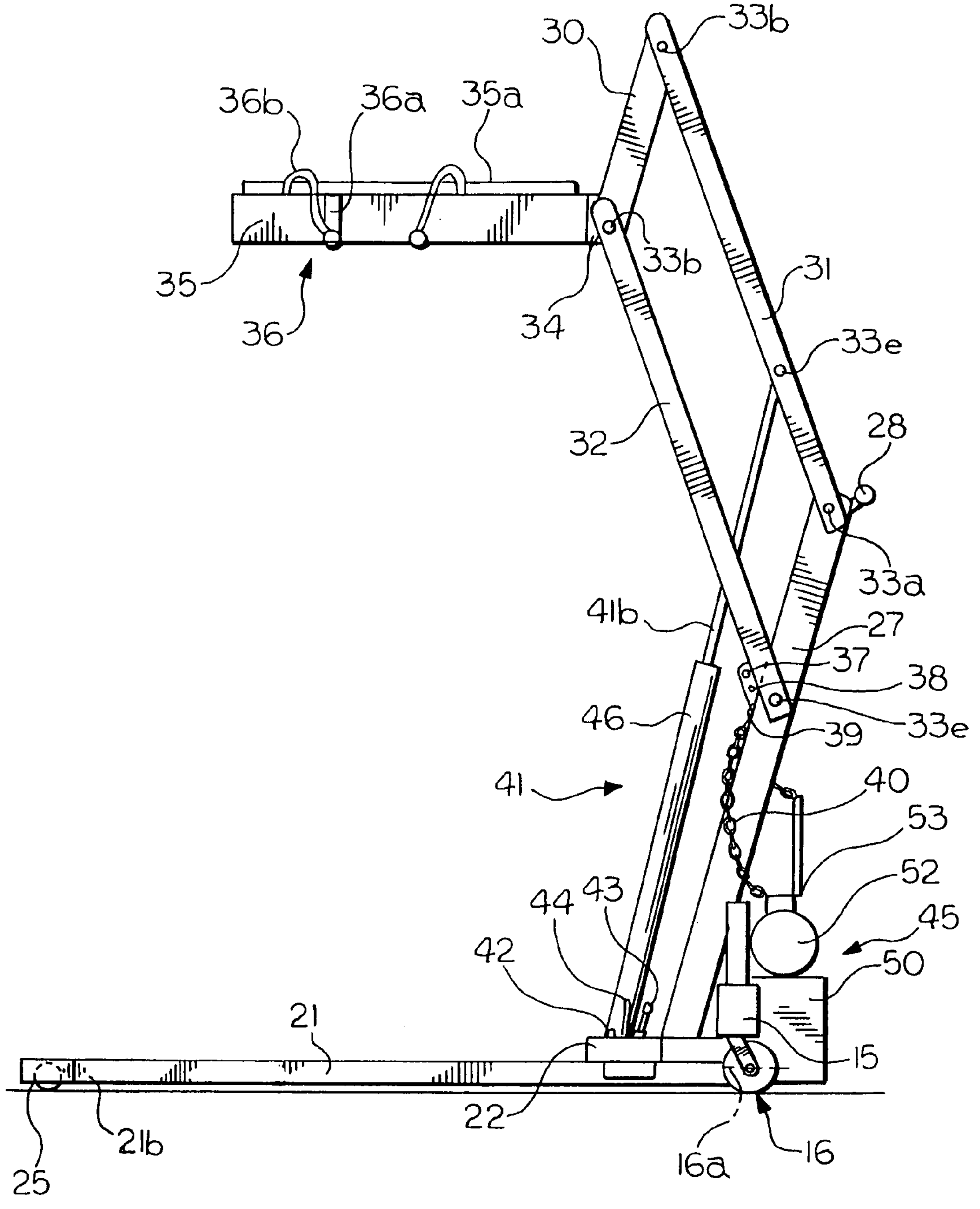
FIG. 4 is a right side elevation view of the lift apparatus shown in FIG. 1 in an operating position.
Figure 5:
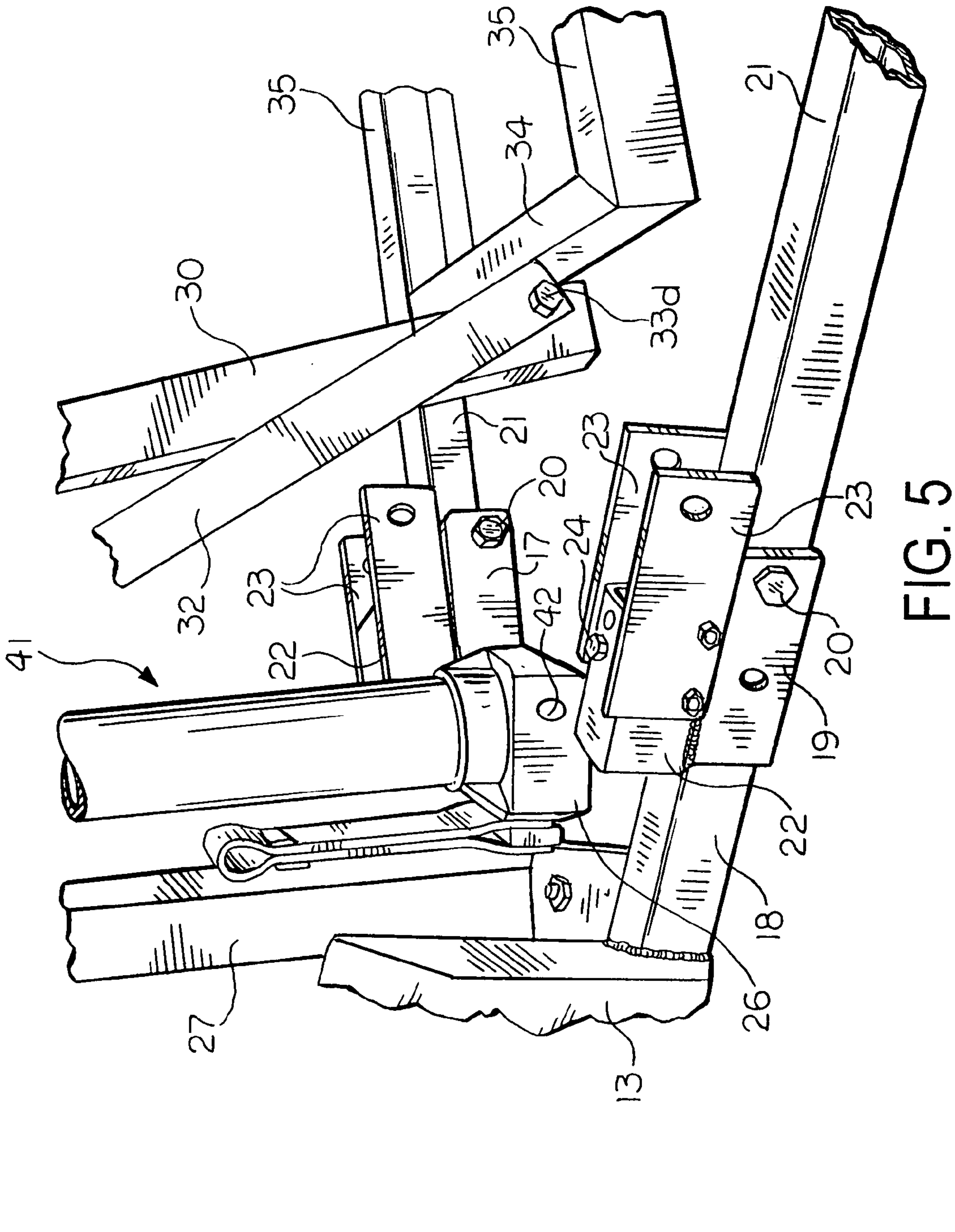
FIG. 5 is a fragmentary perspective view the lift apparatus shown in FIG. 1.

Referring to FIGS. 1 through 5, there is shown a lift apparatus 10 designed to lift motorcycles and other small vehicles for purposes such as maintenance, repositioning and storage. In FIGS. 1–3, the lift apparatus 10 is shown in a folded position that is very compact for easy storage when not in use. A base frame 11 has a central beam 12 extending in a horizontal direction. Attached to opposite ends of the central beam 12 are vertically extending intermediate beams or legs 13 each having an upper end attached to an associated horizontally outwardly extending end beam or arm 14. The beams 12, 13 and 14 can be made from square steel tubing, for example, and welded together. A free end of each of the end beams 14 is cut at an angle and closed by an attached cap or plate 15. A caster assembly 16 is attached to and extends downwardly from the bottom surface of the free end of each of the end beams 14. The caster assemblies 16 can be any suitable commercially available product that typically includes a rubber wheel that rotates about vertical (swivel motion) and horizontal (rolling motion) axes with a foot operated brake lever **16*a*** for controlling the rolling motion.

Attached to a forward facing surface of each end of the central beam 12 is an inner end of each of an inner stub leg 17 and an outer stub leg 18. The stub legs 17 and 18 extend horizontally forwardly and diverge being spaced farther apart at outer ends than at the inner ends attached to the central beam 12. The outer legs 18 are shorter than the inner legs 17 and a first bracket plate 19 is attached to an outer side wall of each of the outer legs 18 adjacent the outer end and extends even with the outer end of the inner stub leg 17. Apertures are formed in the inner legs 17 and the first bracket plates 19 to receive a pivot means or axles 20 in the form of a bolt and nut extending horizontally transverse to a longitudinal axis of the respective outer stub leg 18. Positioned between the inner stub leg 17 and the bracket plate 19 is an inner end 21*a* of a folding leg 21 having apertures formed therein receiving the axle 20 thereby permitting the legs to be rotated between a down or operative position (FIGS. 4–5) and an up or storage position (FIGS. 1–3). The legs 17, 18 and 21 can be made from square steel tubing, for example, with the legs 17 and 18 welded to the central beam and the intermediate beams 13.

A stop 22, in the form of a short length of square tubing, is attached to an upper surface of the outer end of the outer stub leg 18 and extends beyond that outer end. A pair of second bracket plates 23 are attached to opposite side walls of the stop 22 and extend outwardly beyond the outer end of the stop. When the folding leg 21 is rotated about the axle 20 to the up position (FIGS. 1–3), the stop 22 prevents rotation beyond a generally vertical position. A fastener 24 can be inserted through apertures formed in the bracket plates 23 on the opposite side of the leg 21 from the stop 22 to prevent rotation of the folding leg from the up position back to the down position. In the down position of the folding leg 21 (FIG. 5), the fastener 24 can be inserted through vertically aligned apertures formed in the stop 22 and the leg 21 to retain the folding leg in the down position. A roller assembly 25 is attached to an outer end 21*b* of the folding leg 21 at an angle to a longitudinal axis of the folding leg to compensate for the diverging angle of the folding legs. Thus, the roller assemblies 25 are aligned with the caster assemblies 16 during forward and rearward movement of the lift apparatus 10.

A support platform 26 is attached to and extends generally horizontally forward from the central beam 12. A lower end of a center post 27 is attached to an upper surface of the platform 26 and the post extends upwardly and rearwardly to an upper end to which a transversely extending handle 28 is attached. A pair of support members 29 are connected between the center post 29 and the end beams 14. The handle 28 can be grasped by human hands for rolling the lift apparatus 10 on the caster assemblies 16 and roller assemblies 25 when the folding legs 21 are in the down position. When the folding legs 21 are in the up position, the handle 28 can be used to tilt the lift apparatus 10 rearwardly enough to lift the folding leg ends 21*a* off of the ground and permit movement on the caster assemblies 16.

A portion of the center post 27 functions as an inner short link of a parallelogram linkage having an outer short link 30, a pair of upper long links 31 and a pair of lower long links 32. The links 30, 31 and 32 can be formed of square tubing. An inner end of each of the upper long links 31 is coupled on opposite sides of the center post 27 at a pivot means 33*a* adjacent the handle 28. An outer end of each of the upper long links 31 is coupled on opposite sides of the outer short link 30 at a pivot means 33*b* adjacent an upper end of the short link. An inner end of each of the lower long links 32 is coupled on opposite sides of the center post 27 at a pivot means 33*c* spaced below the pivot means 33*a*. An outer end of each of the lower long links 32 is coupled on opposite sides of the outer short link 30 at a pivot means 33*d* adjacent a lower end of the short link. The distance between the pivot means 33*a* and 33*b* is the same as the distance between the pivot means 33*c* and 33*d*, and the distance between the pivot means 33*a* and 33*c* is the same as the distance between the pivot means 33*b* and 33*d*. The pivot means 33*a* through 33*d* can be suitable fasteners such as bolts and nuts.

Attached to the lower end of the outer short link 30 is a transverse bar 34 extending generally parallel to the central beam 12. Attached to and extending horizontally forward from opposite ends of the bar 34 are support bars or arms 35 upon which a motorcycle or small vehicle (not shown) can be supported. The bar 34 and the arms 35 can be formed of square tubing. A strip of padding 35*a*, such as a neoprene material, can be attached to the upper surface of each of the arms 35. The support arms 35 can be provided with vehicle attachment means 36 such as a plurality of sliding brackets 36*a* each having an associated hook 36*b* for cooperation with straps (not shown) that can be routed over and/or through the vehicle to prevent tipping. When the lift apparatus 10 is not in use, the pivot means 33*d* can be removed permitting the outer short link 30 to rotate about the pivot means 33*b* approximately 180° to a storage position a shown in FIGS. 1–3.

Attached to each of the lower long links 32 adjacent to the pivot means 33*c* is a locking plate 37 having a plurality of apertures 38 formed therein. As the lower long link 32 is rotated upwardly about the pivot means 33*c*, each of the apertures 38 in turn clears a front surface of the center post 27. A pin 39 can be inserted through the corresponding ones of the apertures 38 in the plates 37 to engage the central post 27 and prevent downward rotation of the link 32 with a resultant lowering of the support arms 35. Thus, the apertures 38 define fixed positions of the support arms 35 above the surface on which the lift apparatus 10 is resting. The pin 39 can be retained by a chain 40 attached to any suitable portion of the lift apparatus 10 such as the center post 27.

An actuator 41, such as a hydraulic piston and cylinder, can be used to raise and lower the support arms 35. A bottom end of a cylinder 41*a* is attached to the support platform 26 by a pivot means 42 for movement about an axis parallel to the rotation axes of the pivot means 33*a* through 33*d*. The actuator 41 extends between the lower long links 32 and has a piston rod 41*b* extending from the cylinder 41*a* with an upper end connected to the upper long links 31 at a pivot means 33*e*. Thus, extending the rod 41*b* from the cylinder 41*a* raises the support arms 35 and retracting the rod into the cylinder lowers the support arms. The actuator 41 can be manually operated through a pumping handle 43 extending therefrom whereby repeated raising and lowering of the handle forces hydraulic fluid into a cylinder chamber (not shown) against a piston (not shown) to extend the piston rod 41*b*. A release lever 44 is provided to vent the hydraulic fluid from the cylinder chamber thereby allowing the piston rod 41*b* to retract into the cylinder 41*a* under the weight of the supported portions of the lift apparatus 10.

Figure 6:
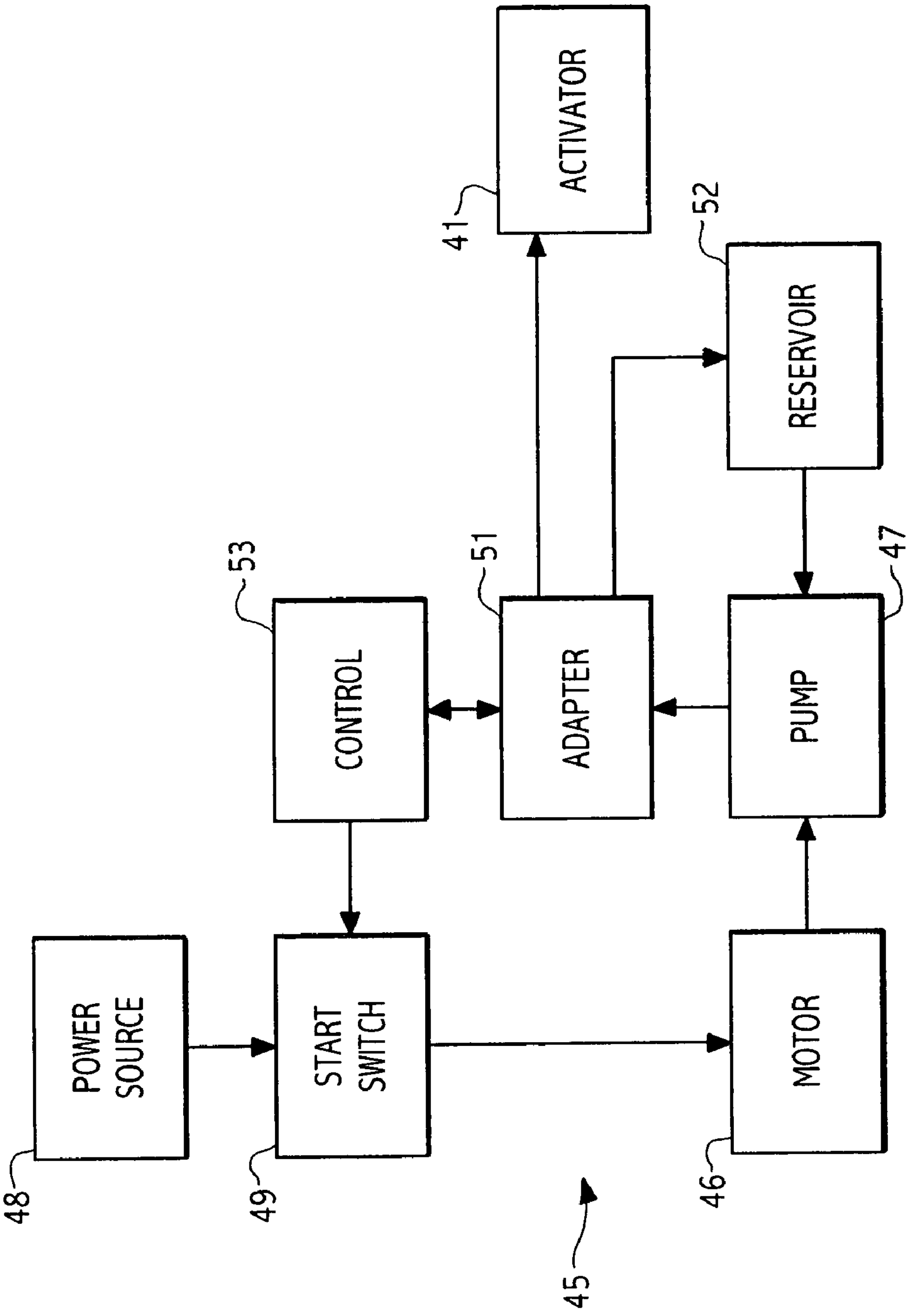
FIG. 6 is a block diagram of the power unit of the lift apparatus shown in FIG. 1.

The actuator 41 also can be automatically operated utilizing a power unit 45 (shown schematically in FIG. 6) including an electric motor 46 driving a hydraulic pump 47. The electric motor 46 can be an ac motor or a dc motor and is connected to a power source 48 through a start switch 49. In the case of an ac motor, the power source typically would be a building electrical circuit accessed at a wall outlet. In the case of a dc motor, the power source 48 could be a storage battery 50 mounted at the rear of the central beam 12. The power source 48 could include a converter (not shown) for changing ac power to de power to operate the dc motor and/or charge the storage battery 50. The motor 46 and the pump 47 are mounted on an adapter 51 with the pump being enclosed in a reservoir 52 mounted on an opposite side of the adapter from the pump. The adapter 51 can be attached to one of the intermediate beams 13 and extend behind the base frame 11.

A control 53 is connected to the adapter 51 and to the start switch 49 for starting and stopping the motor 46. To start the motor 46, the control 53 is actuated to cause the start switch 49 to connect the motor to the power source 48. The motor 46 drives the pump 47 to draw hydraulic fluid from the reservoir 52 and send pressured hydraulic fluid to the adapter 51. The adapter 51 is connected to the actuator 41 to supply the pressured hydraulic fluid causing the actuator to raise the support arms 35. The control 53 can be actuated to stop the motor 46 and retain the actuator 41 in a desired extended position. To lower the support arms 35, the control 53 is actuated to release hydraulic fluid from the actuator 41 to flow through the adapter and back to the reservoir 52.

The manually actuated version of the actuator 41 can be, for example, a commercially available long ram jack such as an eight-ton capacity hydraulic long hand jack with clevis item #14554 available from Northern Tool division of Northern Tool & Equipment Co. at "northerntool.com". An alternative is the eight-ton capacity long ram jack with flat base item #14446 available from Northern Tool. The automatically actuated version of the actuator 41 can be a welded tee hydraulic cylinder item #908320 available from Northern Tool. The associated power unit 45 can include a Haldex Barnes Hydraulics 12 volt DC power unit item #1071 or a Haldex Barnes Hydraulics 1 HP 115/208-230 Volt AC Hydraulic Power Unit item #105881, both available from Northern Tool.

Figure 7:
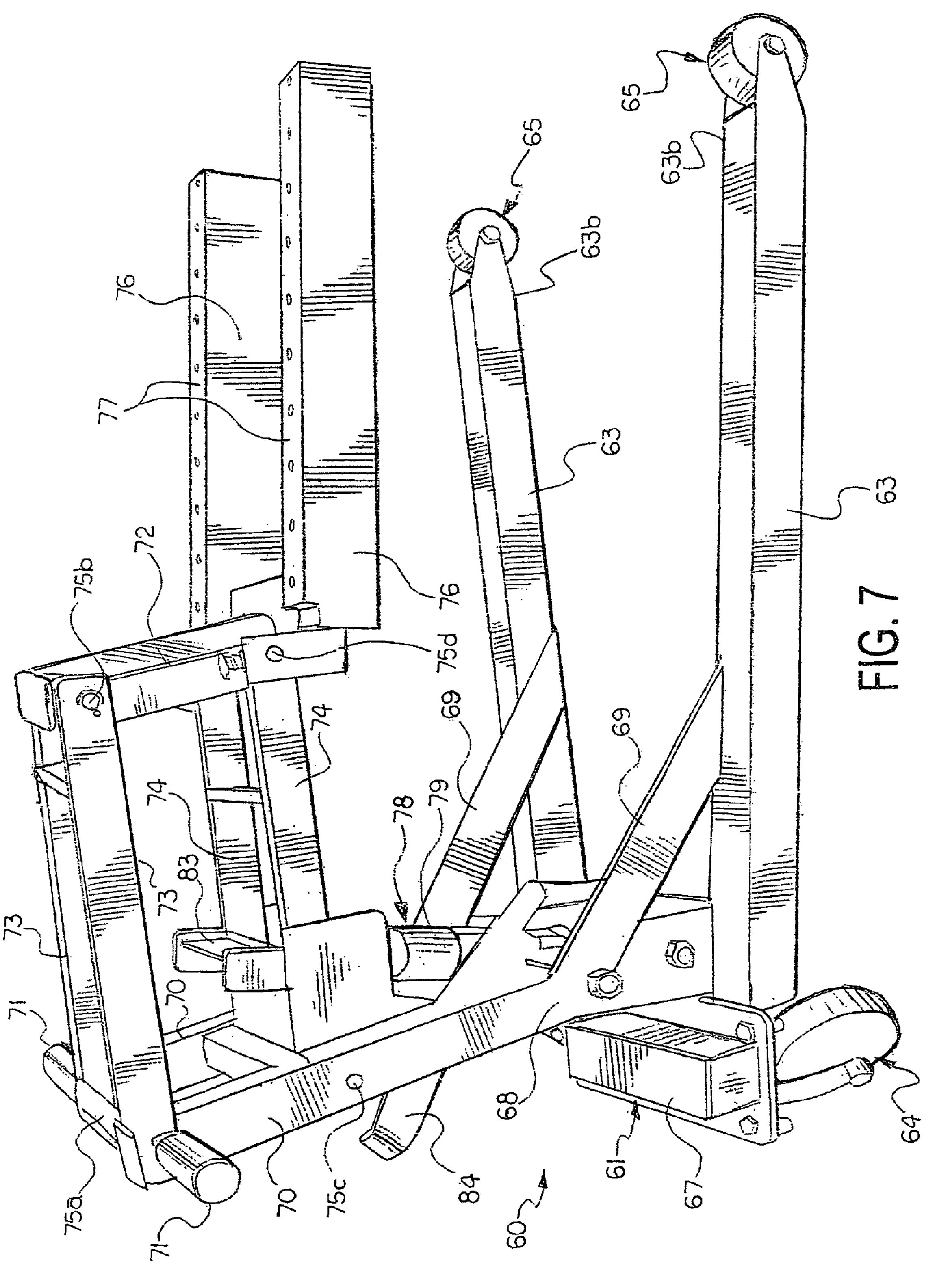
FIG. 7 is a side perspective view of an alternate embodiment lift apparatus in accordance with the present invention.
Figure 8:
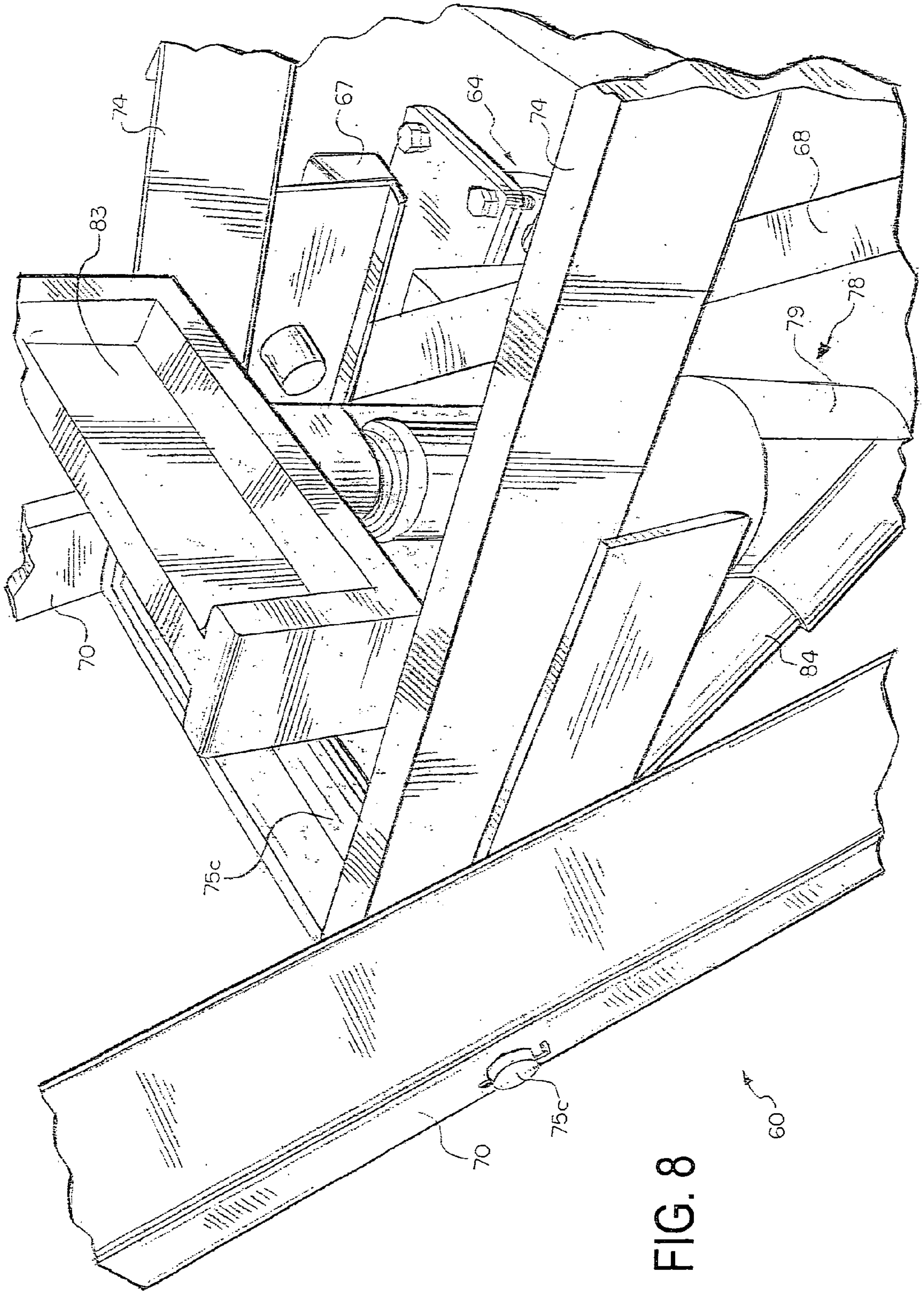
FIG. 8 is an enlarged fragmentary perspective view of the upper end of the actuator and load supporting means shown in FIG. 7.
Figure 9:
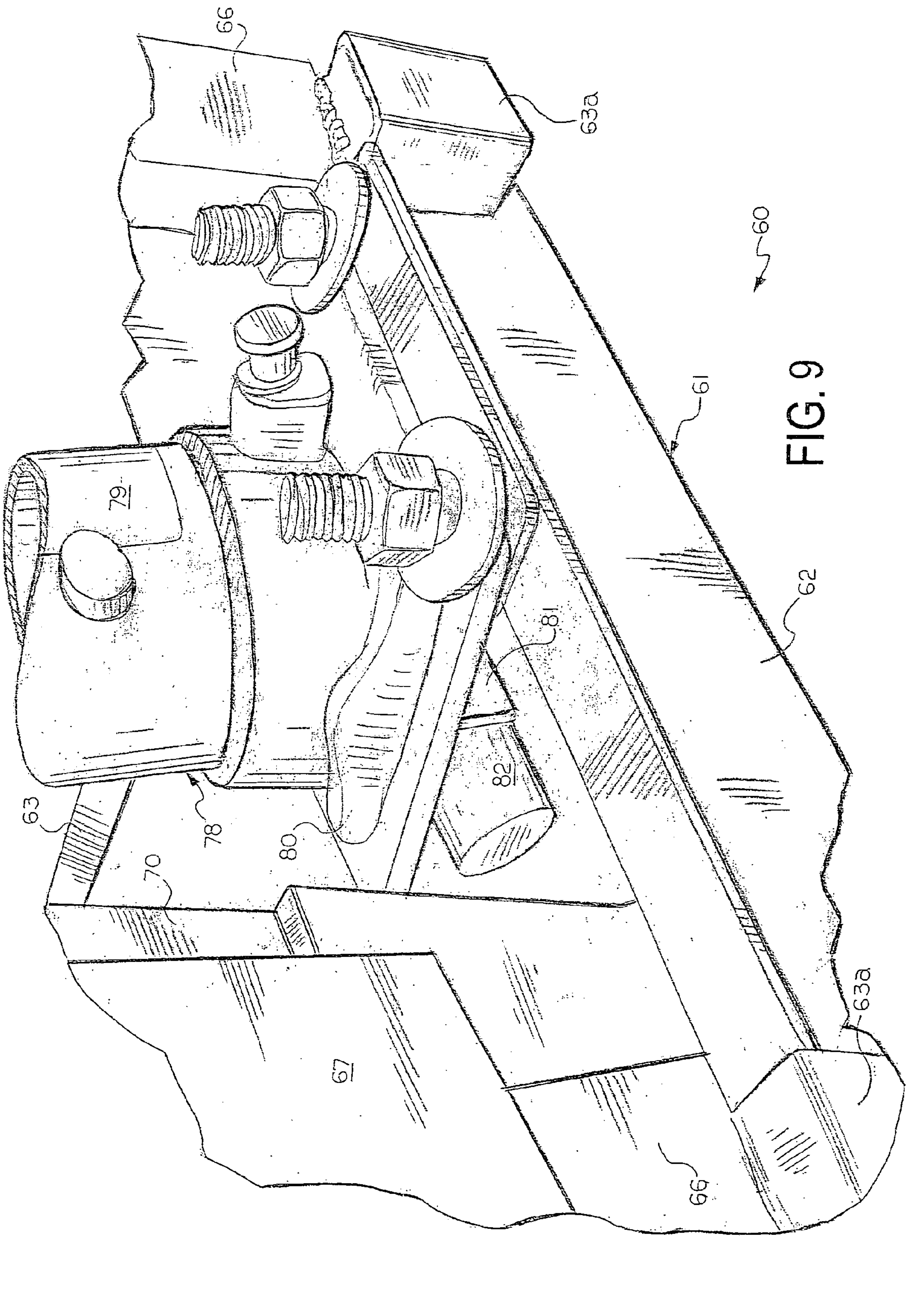
FIG. 9 is an enlarged fragmentary perspective view of the lower end of the actuator shown in FIG. 7.

There is shown in FIGS. 7 through 9 an alternate embodiment lift apparatus 60 designed to lift motorcycles and other small vehicles for purposes such as maintenance, repositioning and storage. In the side view position shown in FIG. 7, the lift apparatus 60 has a forward or front load engaging portion to the right and a rearward or back operating portion to the left. A base frame 61 of the lift apparatus 60 has a supporting central beam 62 extending in a horizontal direction. Attached to opposite ends of the central beam 62 are a pair of horizontally forwardly extending legs 63 each having an inner end 63*a* attached to an associated end of the central beam 62 as best shown in FIG. 9. The legs 63 diverge as they extend from the central beam 62 so that outer free ends 63*b* are spaced farther apart than are the inner ends 63*a*. The central beam 62 and the legs 63 can be made from square steel tubing, for example, and welded together. A caster assembly 64 is connected to and extends downwardly from the base frame adjacent each inner end 63*a* of each of the legs 63 and a roller assembly 65 is attached to each of the outer ends 63*b* of the legs 63 to engage a surface and permit movement of the lift apparatus 60 on the surface. The caster assemblies 64 can be any suitable commercially available product that typically includes a rubber wheel that rotates about vertical (swivel motion) and horizontal (rolling motion) axes.

Extending upwardly from each inner end 63*a* is an attached intermediate beam 66 having an upper end attached to an inner end of a horizontally extending end beam 67. The beams 62, 66 and 67 extend in a generally vertical plane and the caster assemblies 64 are attached to and extend downwardly from associated outer ends of the beams 67. A vertically extending support member 68 is attached to and extends upwardly from each end of the central beam 62. A diagonal support member 69 is attached at one end to an upper end of an associated one of the support beams 68 and extends downwardly and forwardly to attach at an opposite end to the associated leg 63 between the ends thereof. Fastened to each of the support members 68 is a post 70 that extends upwardly and rearwardly. Each post 70 has a handle 71 attached at an upper end and the handles 71 extend in opposite directions generally parallel to the end beams 67.

An upper portion of each post 70 functions as an inner short link of a pair of parallelogram linkages each having an outer short link 72, an upper long link 73 and a lower long link 74. The posts 70 and the links 72, 73 and 74 can be formed of square tubing. An inner end of each of the upper long links 73 is pivotally coupled to the associated post 70 at a pivot means 75*a* (such as an axle) generally axially aligned with the handles 71. An outer end of each of the upper long links 73 is pivotally coupled to outer short links 72 at a pivot means 75*b* (such as an axle) adjacent an upper end of the short links. An inner end of each of the lower long links 74 is pivotally coupled to the associated post 70 at a pivot means 75*c* (such as an axle) spaced below the pivot means 75*a*. An outer end of each of the lower long links 74 is pivotally coupled to the outer short links 72 at a pivot means 75*d* (such as an axle) adjacent a lower end of the short links. The distance between the pivot means 75*a* and 75*b* is the same as the distance between the pivot means 75*c* and 75*d*, and the distance between the pivot means 75*a* and 75*c* is the same as the distance between the pivot means 75*b* and 75*d*.

Attached to the lower end of each of the outer short links 72 is a generally horizontally forwardly extending support bar or arm 76 upon which a motorcycle or small vehicle (not shown) can be supported. The arms 76 can be formed of square tubing. A strip of padding 77, such as a neoprene material, can be attached to the upper surface of each of the arms 76. The support arms 76 can be provided with vehicle attachment means 36 shown in FIG. 4 or any other suitable means.

An actuator assembly 78, including an actuator 79 such as a hydraulic piston and cylinder, can be used to raise and lower the support arms 76. The assembly 78 includes a base plate 80 attached to a bottom end of the actuator 79. Attached to a bottom surface of the plate 80 is a downwardly opening generally U-shaped bracket 81 that receives a length of rod 82 attached to an upper surface of the central beam 62. The bracket 81, and thus the actuator 79, are free to pivot about an axis generally parallel to the axes of the pivot means 75*a* through 75*d*. An upper end of the actuator 79 is pivotally attached to a connector beam 83 extending between and attached to the lower long links 74 forward of the pivot means 75*c*. Thus, as the actuator 79 is extended, the links 72 and 74 are rotated upwardly at the pivot means 75*a* and 75*c* respectively to raise the support arms 76. Retracting the actuator 79 lowers the support arms 76. The actuator 79 can be manually operated through a pumping handle 84 (which can be a foot operated lever) extending from the actuator whereby repeated raising and lowering of the handle forces hydraulic fluid into a cylinder chamber (not shown) against a piston (not shown) to extend the piston rod. A release lever is provided to vent the hydraulic fluid from the cylinder chamber thereby allowing the piston rod to retract into the cylinder under the weight of the supported portions of the lift apparatus 60 and any load supported thereby.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A lift apparatus for supporting a load comprising:

a ground engaging base frame having a generally horizontally extending central beam with opposite ends, a pair of generally vertically extending intermediate beam each having a lower end attached to an associated one of said central beam ends and having an upper end, a pair of generally horizontally extending end beams each having an inner end attached to an associated one of said intermediate beam upper ends and having an outer end, a pair of spaced apart upwardly and rearwardly extending posts each having a lower end connected to said central beam and having an upper end, a pair of generally horizontally extending legs each having an inner end connected to said central beam adjacent one of said posts and having an outer end, said leg inner ends being spaced a first predetermined distance apart and said leg outer ends being spaced a second predetermined distance apart greater than said first predetermined distance;

a pair of ground engaging caster assemblies with each said caster assembly being attached to an associated one of said end beam outer ends;

a pair of ground engaging roller assemblies with each said roller assembly being attached to an associated one of said leg outer ends;

a pair of handles each attached to an associated one of said post upper ends;

a pair of parallelogram linkages, each said linkage having an upper link, a lower link extending generally parallel to said upper link, an outer link, and an inner link formed by a portion of an associated one of said posts, said upper link being connected by first and second pivot means to said inner and outer links respectively, said lower link being connected by third and fourth pivot means to said inner and outer links respectively, said first through fourth pivot means each including an axle about which at least one of said links pivots;

a vehicle support means attached to said outer links and including a pair of spaced apart support arms with padding attached to a load supporting surface of said support arms; and a manually actuated hydraulic actuator having a lower end pivotally attached to said central beam and an upper end pivotally connected to said lower links whereby extension of said actuator raises said vehicle support means from a lowered position for engaging and disengaging a load to a fully raised position.

* * * * *